United States Patent [19]

Pierotti et al.

[11] Patent Number: 4,758,272

[45] Date of Patent: Jul. 19, 1988

[54] POROUS METAL BODIES

[75] Inventors: Kim D. Pierotti; Raja R. Wusirika, both of Painted Post, N.Y.

[73] Assignee: Corning Glass Works, Corning, N.Y.

[21] Appl. No.: 54,845

[22] Filed: May 27, 1987

[51] Int. Cl.$^4$ .............................................. B22F 5/00
[52] U.S. Cl. ...................................... 75/246; 75/249; 55/523; 419/2; 419/36; 419/37
[58] Field of Search ................. 419/2, 36, 37; 75/246, 75/249; 55/523

[56] References Cited

U.S. PATENT DOCUMENTS

| | | | |
|---|---|---|---|
| 2,157,596 | 5/1939 | Davis | 419/2 |
| 2,220,641 | 11/1940 | Davis | 419/2 |
| 4,313,759 | 2/1982 | Raybould | 75/249 |
| 4,702,885 | 10/1987 | Odami et al. | 75/249 |
| 4,711,823 | 12/1987 | Shiina | 75/249 |

Primary Examiner—Stephen J. Lechert, Jr.
Attorney, Agent, or Firm—Richard N. Wardell; Clinton S. Janes, Jr.

[57] ABSTRACT

This invention is concerned with the production of hard, porous, sintered bodies consisting essentially of Al and Fe with, optionally, Sn and/or Cu and/or Cr. The mechanism of the invention relies upon the presence of a small amount of Mg and/or Ca to act as a getter for oxygen. In the preferred embodiment, particles of the metals can be extruded into honeycomb structures which can then be fired in the presence of Mg and/or Ca to yield sound high cell density structures of controlled porosity.

16 Claims, No Drawings

POROUS METAL BODIES

BACKGROUND OF THE INVENTION

The present invention relates to the fabrication of hard porous bodies particularly suitable as filter media for liquids and gases in highly oxidizing and thermally extreme environments which are prepared through the sintering together of metal particles. The preferred embodiment of the invention comprises the extrusion of metal particles into porous honeycomb structures that can perform as filters in the harshly corrosive exhaust stream of an internal combustion engine.

Porous ceramic bodies have been commercially exploited for a variety of industrial uses. For example, porous ceramic honeycomb structures have been employed to filter the exhaust stream of a diesel engine (U.S. Pat. No. 4,329,162). Whereas porous ceramic bodies continue to be a popular and useful material in such environments, there has been a desire to develop materials exhibiting greater mechanical strength, thermal resilience, and resistance to corrosion in highly oxidizing atmospheres. Because of the greater mechanical strength and resistance to thermal shock recognized as inherent in many metals, when compared to ceramic bodies, an investigation was undertaken to develop porous metal bodies capable of extended service in extremely hostile environments, especially in such highly oxidizing atmospheres as the exhaust stream of an internal combustion engine.

Stainless steel substrates are common to the internal combustion catalytic converter art. U.S. Pat. No. 3,788,486 suggests the use of sintered powder metal, generally, for use as porous filters. Disclosed is the use of austenitic stainless steel for use as a filter structure after being machined from a cylinder block; there is no mention of extruding a metal powder. U.S. Pat. No. 4,277,374 discloses the use of ferritic stainless steel which includes the addition of aluminum to improve the oxidation resistance of the porous substrate, with no mention of extrusion. U.S. Pat. No. 4,582,677 discloses the use of 100% pure aluminum, copper, titanium or zirconium metals as extrudable porous metallic honeycombs.

The prior art powdered metallic substrates suffer from either poor sinterability and/or mechanical strength, or they have poor corrosion resistance.

The primary object of the present invention is to overcome the deficiencies of the prior art and to provide a hard porous metal body which exhibits a mechanical strength typical of metals and is capable of enduring the thermal cycling and the oxidative corrosion inherent in the exhaust system of an internal combustion engine. The stability of the present inventive substrate body in highly corrosive environments invites its use in less corrosive environments as a substrate body with all of the above cited advantages.

SUMMARY OF THE INVENTION

The above object can be achieved in bodies consisting essentially, as analyzed, of at least 80% by weight Al and Fe and no more than about 1% of an alkaline earth metal selected from the group consisting of Mg and Ca. Hence, the basic inventive compositions consist essentially, as analyzed in weight percent of about 50-90% Fe, 5-30% Al, and no more than about 1% Mg and/or Ca, with useful optional additions including up to 10% Sn, up to 10% Cu, and up to 10% Cr, the total of Sn and Cu and Cr being less than about 20%.

As can be appreciated, Fe constitutes the major structural component of the body; the preferred proportion thereof ranging about 70-90% with the most preferred being a concentration between 75-85%. Al imparts the necessary resistance to oxidation demanded in the products; the preferred level ranging about 12-16% with the most preferred products having about 14-15%.

The presence of Mg and/or Ca promotes the sintering of the Fe-Al composition. Furthermore, the inclusion of Mg and/or Ca inhibits the production of a layer of $Al_2O_3$ on the Al. There is an intrinsic tendency for a 10–20 Å layer of $Al_2O_3$ to develop on the surface of Al; such a layer severely restricts the sintering of Al particles. In essence, then, the Ca and Mg metals act as getters for oxygen, thereby permitting good sintering of Al and Fe into sound, integral bodies.

Although the inclusion is not mandatory, the presence of up to 10% Sn is advantageous to facilitate and enhance sintering; the preferred composition interval being about 3–7% with the most preferred being about 4–5%. Likewise, whereas its inclusion is not necessary, the presence of up to 10% Cu is highly desirable. Cu has the capability of inhibiting Sn sweating. Since Sn is insoluble in Al, the result of the sintering together of Al and Sn particles is the tendency of Sn to separate out. The introduction of Cu limits that separation and promotes the utility of Sn as a sintering aid in the Al-Fe system. The effect of Cu addition can be discerned almost immediately; however, truly substantial improvement in inhibiting Sn separation and enhancement of Sn as a sintering aid becomes apparent at about 3% Cu, with the preferred Cu levels ranging about 4–8.5% and the most preferred interval between about 5–7%.

The addition of up to 10% Cr appears to increase the ductility of the final product. In general, at least 5% Cr will be required to import a significant improvement.

In the broadest terms, the process for preparing the hard porous bodies of the invention comprises sintering Al, Fe, and Mg and/or Ca with, optionally, Sn, Cu, and/or Cr into a sintering body. Two basic methods for carrying out the sintering procedure have been found operable. To illustrate:

The first method contemplates four general steps:
(a) a homogeneous mixture of the metals, preferably in finely particulate form, is prepared;
(b) that mixture is blended into a sufficient amount of organic binder/vehicle medium to produce a readily formable admixture;
(c) that admixture is formed into a shape of a desired configuration; and
(d) that shape is fired in essentially non-oxidizing atmosphere to a temperature between about 1000°–1400° C. for a sufficient length of time to vaporize off excess Mg and/or Ca and sinter the particles together into a final shape of desired porosity.

If desired, steps (a) and (b) may be combined by mixing the powders into the binder/vehicle medium to form a homogeneous admixture.

Because of the high reactivity of Mg and Ca metals at 1000°–1400° C., a relatively small amount only, no more than about 0.5% by weight, will be required in the initial mixture. Much larger quantities e.g., 5% or even more, will, of course, be operable, but such large amounts are not only unnecessary but they must be vaporized away so as not to comprise a substantial component of the final product. Furthermore, because of the extreme reactivity of metallic Mg and Ca, readily vaporizable compounds thereof, e.g., $MgF_2$ and $CaF_2$, may desirably substituted therefor.

The second method also comprehends four general steps:

(1) a homogeneous mixture of Al and Fe with, optionally, Sn, Cu, and/or Cr preferably in finely particulate form is prepared;

(2) that mixture is blended into a sufficient amount of organic binder medium to produce a readily formable admixture;

(3) that admixture is formed into a shape of desired configuration; and (4) that shape is fired in an essentially non-oxidizing atmosphere to a temperature between about 1000°–1400° C., preferably at least 1150° C., in close relation to, but at least partially out of direct contact with, a source of Mg and/or Ca for a sufficient length of time to cause vapors of Mg and/or Ca to contact the particulate Al and to sinter together the particles of Al and Fe and any optional metal particles present into with a final shape of desired porosity.

It was observed above that Mg and Ca vaporize at the temperature used for sintering. This second method relies upon the transport of those vapors to the shaped admixture body to perform the necessary gettering of oxygen with consequent desired sintering. The porosity of the body permits ready permeation of the vapors therethrough. A mild flow of an essentially non-oxidizing gas, e.g., argon or helium, can expedite the gettering action of the Mg and/or Ca. The fluoride or other readily-vaporizable compound of Mg and/or Ca may again be substituted for the metal. The analysis of the final sintered product may reveal the presence of as little as a few ppm (parts/million) of Mg and/or Ca therein. Hence, the presence of Mg and/or Ca in the final product is not only unnecessary to produce the desired characteristics therein, but may be undesirable since the properties of the Fe/Al base material are adversely affected thereby. Accordingly, the preferred products will have no more than a few ppm Mg and/or Ca therein.

To insure the absence of unwanted voids in the final body, the formed mixture of metal particles and organic binder/vehicle medium in both methods may be dried at room temperature or heated slightly, e.g., up to 500° C., to volatilize off the binder, and then fired to the sintering temperature.

The shaping of the admixture of metal particles and organic binder into a "green," i.e., unfired, body can be undertaken through such means as cold pressing, hot pressing, isostatic pressing, molding, and rolling. In the preferred embodiment of the invention, however, the mixture is extruded through a die to form a green honeycomb structure.

The size of metal particles employed is dependent upon the complexity of shape configuration and wall thickness involved, as well as the level of porosity and the size of pores desired in the final product. Hence, whereas coarse particles, e.g., particles passing a No. 6 U. S. Standard Sieve (3.36 mm), can be pressed into integral bodies, particles passing a No. 100 U. S. Standard Sieve (149 microns) are much preferred for close control of porosity and size of pores, with particles passing a No. 325 U. S. Standard Sieve (44 microns) being the most preferred. The latter-sized particles are of particular utility in the extrusion of honeycomb structures having very thin walls between the cells.

The size of the pores is a function of particle size and the temperature and time of the sintering process. Hence, the pore size can vary widely. Excessively high temperatures and/or long firing times may lead to too small pores, whereas undersintering can leave too large pores. Nevertheless, the use of the body as a filter medium requires rather close control over pore size, the size demanded being dictated by the material to be removed from the fluid. In general, in honeycomb structures destined for filter media in exhaust streams of internal combustion engines, the pore size will be held within narrow ranges between about 1–100 microns, with pores tightly controlled in size between about 10–50 microns being preferred.

The level of total porosity is also a function of particle size and the temperature and time of the sintering process. Hence, in like manner to pore size, total porosity can vary widely. In honeycomb structures designed for use as filter media in exhaust streams of internal combustion engines, however, the porosity will range between about 25–75% by volume. Below 25% the pressure required to force the exhaust gases through the filter becomes excessive. At about 75% the structure becomes weak. A porosity between about 40–60% is preferred.

With the above conditions in mind, honeycomb structures can be extruded having cell densities from 10 to greater than 2400 cells/in$^2$ with cell walls as thin as about 75 microns. The preferred structures have cell densities of about 50–600 cells/in$^2$ with wall thicknesses varying over the range of about 100–700 microns.

The invention herein described may also be advantageously applied as a diesel particulate filter as before described in U.S. Pat. No. 4,329,162, incorporated herein by reference.

DESCRIPTION OF PREFERRED EMBODIMENT

In the examples reported in the following table, small discs of the compositions were formed by ball milling powders of the components in isopropyl alcohol, drying the powder mixture for about 4 hours at a temperature of about 95° C., and then dry pressing the powder mixture into discs having a diameter of about 20 mm and a height of 5 mm. The discs were thereafter fired for about one hour in an atmosphere of flowing argon at a temperature of about 1300° C. For convenience, the commercially-available 50% by weight iron/50% by weight aluminum alloy was employed as a source of both iron and aluminum. Additional iron powder was added to provide the high iron content of the examples. Because bodies of high refractoriness were desired, the aluminum level was held to a maximum of about 15%. The refractoriness of the products falls as the aluminum concentration rises above 15%. Oxidation resistance of the final produce is improved, however, as the proportion of aluminum is increased.

The compositions recited in weight percent in the table reflect powder concentrations in the original batch since, as was observed above, the Mg and/or Ca component vaporizes away during the forming step. Hence, there may be no more than a few ppm (parts/million) of those components remaining in the fired product.

In the table "Yes" indicates a visual appraisal of good sintering of the discs; "No" records a visual appraisal of poor sintering, if any.

TABLE

| Example | Fe | Al | Sn | Cu | Mg | Ca | Sinter |
|---------|------|------|-----|-----|-----|-----|--------|
| A | 81.6 | 13.1 | 2.0 | 3.3 | — | — | No |
| B | 77.1 | 14.9 | 5.0 | — | 3.0 | — | Yes[1] |
| C | 71.5 | 14.0 | 5.0 | 6.5 | 3.0 | — | Yes |
| D | 73.5 | 14.0 | 4.5 | 6.5 | 1.5 | — | Yes |
| E | 81.0 | 14.0 | 2.0 | — | 3.0 | — | No |
| F | 72.5 | 14.0 | 4.5 | 6.5 | 2.5 | — | Yes |
| G | 76.6 | 14.9 | 5.3 | — | 3.2 | — | No |
| H | 82.0 | 12.0 | 6.0 | — | — | — | No |
| I | 86.0 | 14.0 | — | — | — | — | No |
| J | 79.5 | 14.0 | — | 6.5 | — | — | No |
| K | 74.5 | 14.0 | 5.0 | 6.5 | — | — | No |
| L | 71.5 | 14.0 | 5.0 | 6.5 | 3.0 | — | Yes[2] |
| M | 73.5 | 14.0 | 5.0 | 6.5 | — | 1.0 | Yes[3] |
| N | 71.5 | 14.0 | 5.0 | 6.5 | — | 3.0 | Yes[3] |
| O | 73.5 | 14.0 | 4.5 | 6.5 | — | 1.5 | Yes[3] |
| P | 75.5 | 14.0 | 4.0 | 6.5 | — | — | No |
| Q | 81.0 | 12.0 | 5.0 | 2.0 | — | — | No |

[1] disc calcined at 600° C. prior to sintering
[2] MgF$_2$ source of Mg
[3] CaF$_2$ source of Ca An inspection of the table, immediately confirms the need for Mg and/or Ca to be present. Also, a comparison of Examples C and L demonstrates a readily-vaporizable compound of Mg can be used in substitution for metallic Mg. Finally, Table I illustrates that only a small amount of Mg and/or Ca will be operable as a getter for oxygen, thereby enabling the desired sintering of aluminum and iron with, optionally, copper and/or tin and/or chromium into a hard porous body. The inclusion of tin has been found especially advantageous in enhancing the oxidation resistance of the final product, particularly when the product is subjected to thermal cycling; e.g.; repeated heatings to 1000° C. and cooling to room temperature.

To demonstrate the capability of forming a hard, porous, sintered honeycomb structures, powder of the commercial Fe/Al alloy and additional powdered iron to yield a combination approximately 84.4% by weight Fe and 15.6% by weight Al (both powders passing a No. 325 United States Standard Sieve) were mixed with about 3–8% by weight methylcellulose, 0.5% by weight zinc stearate lubricant, and a 0.5–1% by weight oleic acid wetting agent, and that mixture extruded into a cylindrical honeycomb structure having a 4" diameter, a length of 15', and a 400 cell/in$^2$ cross section with cell wall thickness of about 150 microns. The honeycombs were dried as 12" lengths at a temperature below about 300° C. for 12 hours. Samples having a length of about 4" were cut from the honeycombs and placed into molybdenum boats and/or alumina crucibles. A charge of Mg metal or MgF$_2$ was placed in molybdenum boats and those boats positioned adjacent to those containing the honeycomb samples. The juxtaposed boats were then fired for about 15–30 minutes in an atmosphere of mildly flowing argon at temperatures between 1150°–1300° C. The sintered structures resulting therefrom exhibited a porosity ranging between about 40–50% with pore sizes varying about 1–20 microns.

We claim:

1. A hard, porous body consisting essentially, as analyzed in weight percent, of 5–50% Al, 30–90% Fe, the sum Al and Fe constituting at least 80% of the total composition, 0–10% Sn, 0–10% Cu, 0–10% Cr, the sum Sn and Cu and Cr being less than 20%, at least some and not more than 1% of an alkaline earth metal selected from the group consisting of Mg and Ca.

2. A body according to claim 1 wherein said Al is present in an amount of 12–16%, said Fe is present in an amount of 70–90%, and said alkaline earth metal is present in an amount of a few ppm.

3. A body according to claim 1 wherein said Sn is present in a amount of 3–7% and said Cu is present in an amount of 3–8.5%.

4. A body according to claim 3 wherein said Cr is present in an amount of at least 5%.

5. A body according to claim 1 having a porosity of about 25–75% by volume with pores ranging between 1–100 microns in size.

6. A hard, porous honeycomb structure having a cell density of at least 10 cells/in$^2$ with the walls of said cells having a thickness of at least 75 microns, said structure being composed of a material having a porosity of about 25–75% by volume, with pores ranging between about 1–100 microns in size, and consisting essentially, as analyzed in weight percent, of 5–50% Al, 30–40% Fe, the sum Al and Fe constituting at least 80% of the total composition, 0–10% Sn, 0–10% Cu, 0–10% Cr, the sum Sn and Cu and Cr being less than 20% at least some, and not more than about 1% of a alkaline earth metal selected from the group consisting of Mg and Ca.

7. A structure according to claim 6 wherein said cell density ranges between about 50–600 cells/in$^2$ and said cell walls range in thickness between about 100–700 microns.

8. A structure according to claim 6 wherein the porosity of said material ranges about 40–60% by volume and the size of the pores ranges about 10–50 microns.

9. A method for producing a hard porous body consisting essentially, as analyzed in weight percent, of 5–50% Al, 30–90% Fe, the sum Al and Fe constituting at least 80% of the total composition, 0–10% Sn, 0–10% Cu, 0–10% Cr, the sum Sn and Cu and Cr being less than 20% at least some, and not more than 1% of an alkaline earth metal selected from the group consisting of Mg and Ca, which comprises the steps of:

(a) preparing a homogenous mixture of particulate Al, Fe, and, optionally, Sn, Cu, and Cu in the proper proportions with at least 0.5% particulate alkaline earth metal or an amount of a particulate readily-vaporizable alkaline earth metal compound sufficient to yield at least 0.5% alkaline earth metal in an organic binder/vehicle;

(b) forming said mixture into a shape of a desired configuration; and then (c) firing said shape in an essentially non-oxidizing atmosphere to a temperature between about 1000°–1400° C. for a sufficient length of time to vaporize off any excess alkaline earth metal and to sinter the metal particles together into a sound, integral body of desired porosity.

10. A method according to claim 9 wherein said formed mixture of Step (b) is first dried at ambient temperature or at an elevated temperature below about 500° C. to volatilize off said organic binder/vehicle medium, and then fired to sinter the particles together.

11. A method according to claim 9 wherein said particulate materials are of a size to pass a No. 100 United States Standard Sieve.

12. A method according to claim 9 wherein said mixture of Step (a) is extruded into a honeycomb structure and then fired to produce a sound, integral honeycomb structure having a cell density of at least 10 cells/in$^2$ with the walls of said cells having a thickness of at least 75 microns, the material comprising said structure having a porosity of about 25–75% by volume with pores ranging between about 1–100 microns in size.

13. A method for producing a hard porous body consisting essentially, as analyzed in weight percent, of 5–50% Al, 30–90% Fe, the sum Al and Fe constituting at least 80% of the total composition, 0–10% Sn, 0–10% Cu, 0–10% Cr, the sum Sn and Cu and Cr being less than 20% at least some, and not more than 1% of an alkaline earth metal selected from the group consisting of Mg and Ca, which comprises the steps of:
  (a) preparing a homogenous mixture of particulate Al, Fe, and, optionally, Sn, Cu, and Cr in the proper proportions in an organic binder/vehicle medium;
  (b) forming said mixture into a shape of a desired configuration; and then
  (c) firing said shape in an essentially non-oxidizing atmosphere to a temperature between about 1000°–1400° C. in close relation to, but at least partially out of contact with, a source of particulate alkaline earth metal selected from the group of Mg and Ca or a particulate readily-vaporizable alkaline earth metal compound for a sufficient length of time to cause vapors of said alkaline earth metal to contact the particulate Fe and Al and to sinter the metal particles together into a sound, integral body of desired porosity.

14. A method according to claim 13 wherein said formed mixture of Step (b) is first dried to ambient temperature or at an elevated temperature below about 500° C. to volatilize off said organic binder/vehicle medium, and then fired to sinter the particles together.

15. A method according to claim 13 wherein said particulate materials are of a size to pass a No. 100 United States Standard Sieve.

16. A method according to claim 13 wherein said mixture of Step (a) is extruded into a honeycomb structure and then fired to produce a sound, integral honeycomb structure having a cell density of at least 10 cells/in$^2$ with the walls of said cells having a thickness of at least 75 microns, the material comprising said structure having a porosity of about 25–75% by volume with pores ranging between about 1–100 microns in size.

* * * * *